Figure 1:
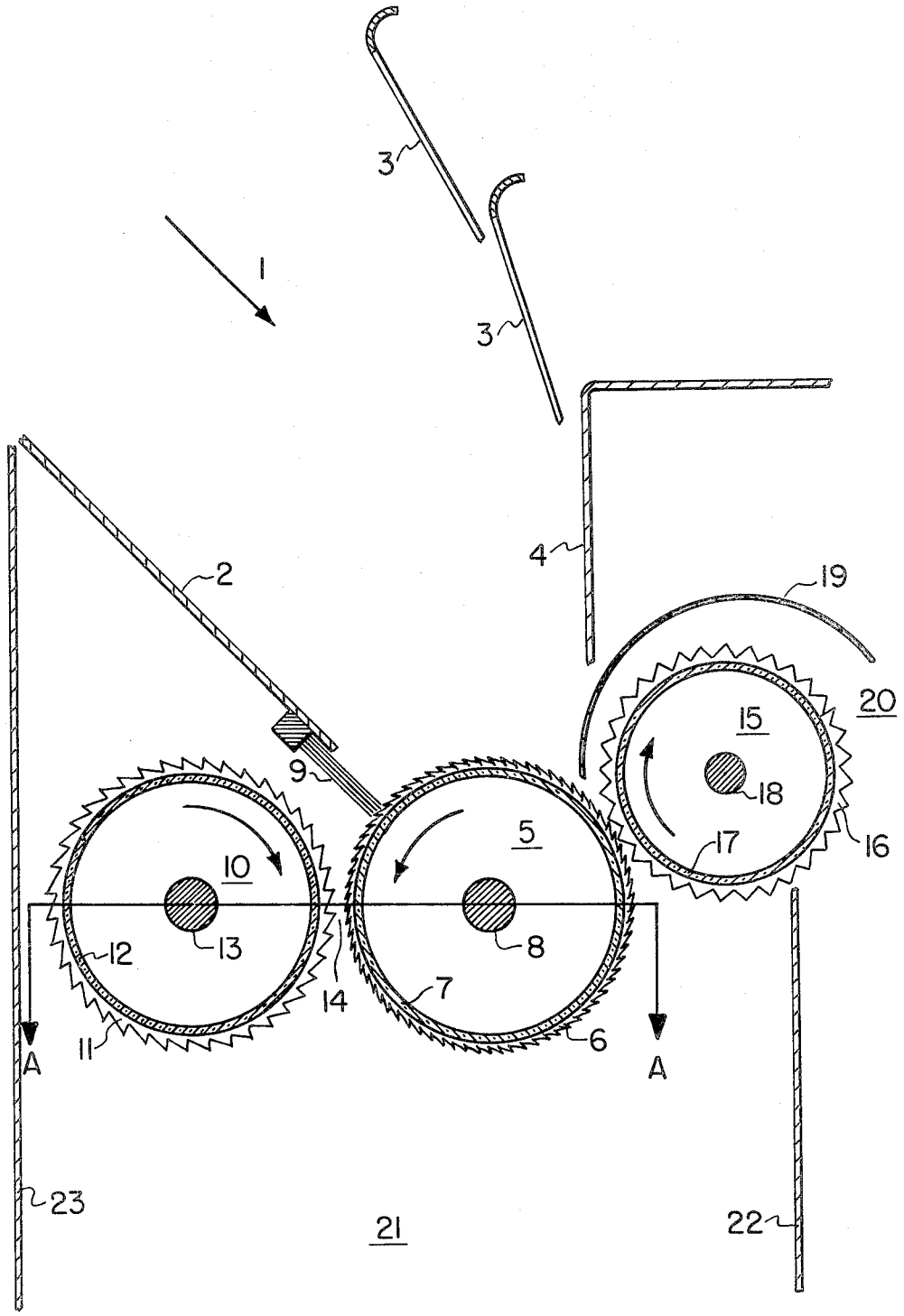
Figure 2:
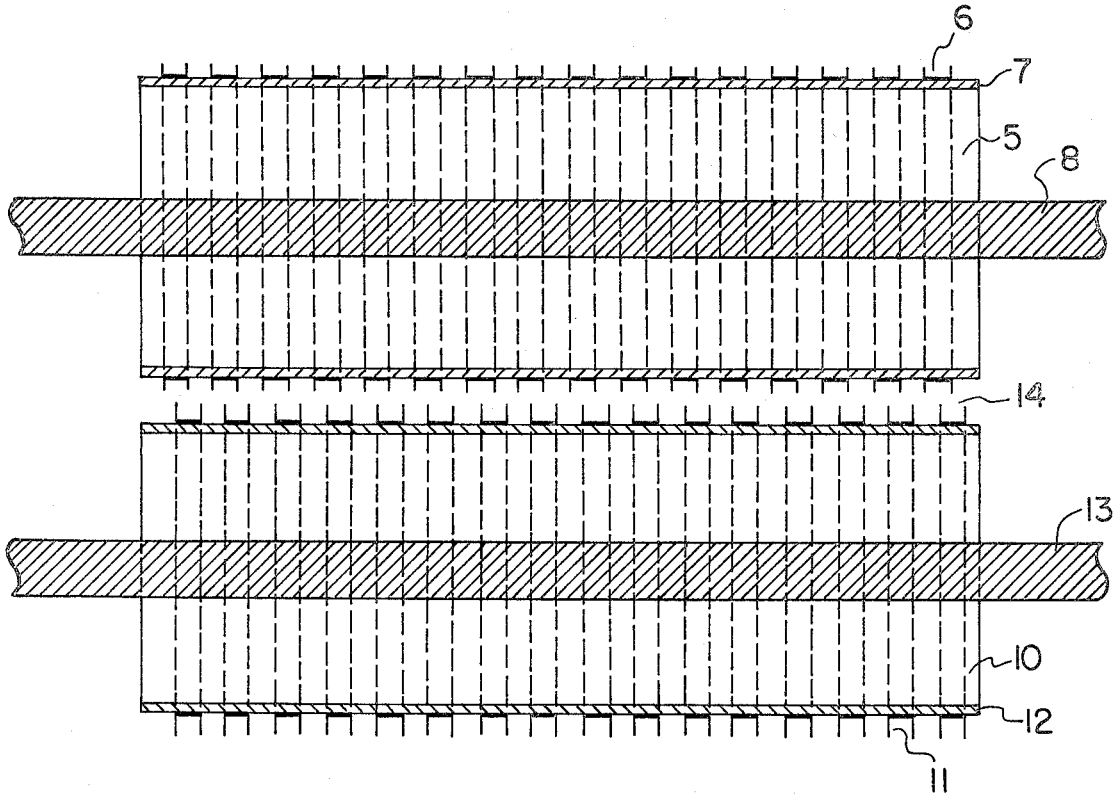
Figure 3:
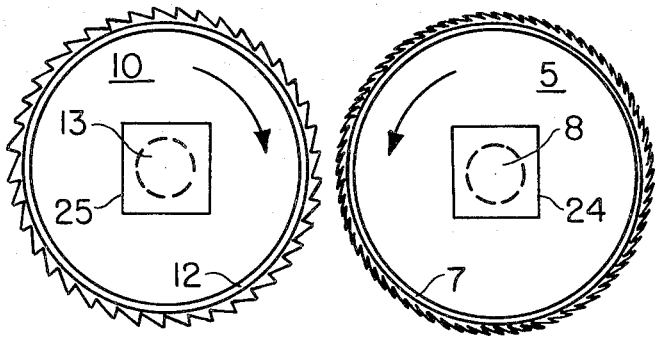

United States Defensive Publication [19] (H) [11] T988,001

Smith [43] Nov. 6, 1979

[54] DIFFERENTIAL ACTION EXTRACTOR COMB

[75] Inventor: Lowrey A. Smith, Auburn, Ala.

[73] Assignee: The United States of America as represented by the Secretary of Agriculture, Washington, D.C.

[21] Appl. No.: 944,678

[22] Filed: Sep. 22, 1978

Related U.S. Application Data

[63] Continuation-in-part of Ser. No. 844,336, Sep. 22, 1978, abandoned.

[51] Int. Cl.[2] ..... D01B 3/00

[52] U.S. Cl. ..... 19/203

[57] ABSTRACT

This invention relates to a unique method of combing stripper harvested seed cotton in order to facilitate the removal of trash components such as large sticks and burrs.

Further it relates to a coarse-tooth, reverse pitch, combing saw cylinders, turning with opposite rotation to a fine-toothed combed saw cylinder such that the saw teeth on the adjacent side of the two cylinders move in the same direction without overlap.

Further it relates to the combing action of two adjacent saw cylinders of the same nominal diameter operating at different speeds such that sticks, burrs, and other large trash components are held momentarily by the slower rotating teeth of the combing cylinder as the seed-cotton attached to the combed cylinder passes through the combing area between the cylinders.

The large sticks and burrs are loosened or detached from the seed cotton by the combing action to facilitate their separation from the seed cotton by either centrifugal sling off from the combed cylinder or by subsequent processing through a conventional stick machine composed of a single saw cylinder partially surrounded by concentrically spaced grid bars.

6 Claims, 3 Sheets Drawing,

14 Pages Specification

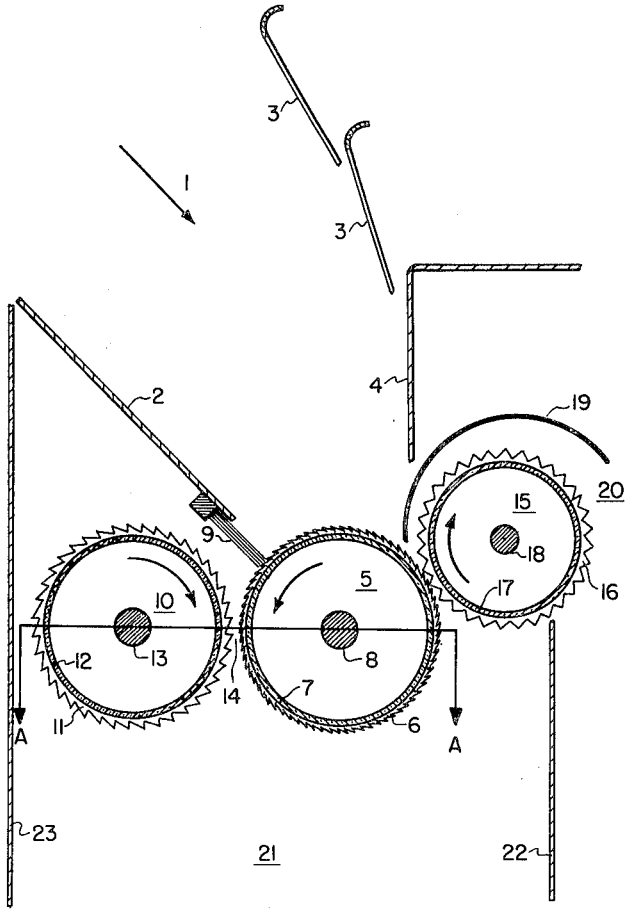

The file of this unexamined application may be inspected and copies thereof may be purchased (849 O.G. 1221, Apr. 9, 1968).